(12) United States Patent
Yamashina et al.

(10) Patent No.: US 10,901,132 B2
(45) Date of Patent: Jan. 26, 2021

(54) LIGHTING APPARATUS

(71) Applicant: Panasonic Intellectual Property Management Co., Ltd., Osaka (JP)

(72) Inventors: Daigo Yamashina, Osaka (JP); Hironori Akiyama, Osaka (JP); Kazuyuki Yamae, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/793,245

(22) Filed: Feb. 18, 2020

(65) Prior Publication Data

US 2020/0271848 A1 Aug. 27, 2020

(30) Foreign Application Priority Data

Feb. 27, 2019 (JP) ................................ 2019-034779

(51) Int. Cl.
*F21V 8/00* (2006.01)
*C08L 53/02* (2006.01)
*G02B 1/04* (2006.01)

(52) U.S. Cl.
CPC .......... *G02B 6/0028* (2013.01); *C08L 53/025* (2013.01); *G02B 1/045* (2013.01); *G02B 6/0031* (2013.01); *G02B 6/0081* (2013.01)

(58) Field of Classification Search
CPC .... G02B 1/045; G02B 6/0028; G02B 6/0031; G02B 6/0081; C08L 53/025
See application file for complete search history.

(56) References Cited

U.S. PATENT DOCUMENTS

| | | | | |
|---|---|---|---|---|
| 2003/0007343 A1* | 1/2003 | Ohwada | ............... | G02B 6/0088 362/601 |
| 2003/0165054 A1* | 9/2003 | Ohizumi | ............... | G02B 6/0068 362/603 |
| 2003/0169386 A1* | 9/2003 | Goto | .................... | G02B 6/0055 349/65 |
| 2006/0104089 A1* | 5/2006 | Feng | .................... | G02B 6/0061 362/608 |
| 2009/0196066 A1 | 8/2009 | Masuda | | |
| 2015/0355405 A1* | 12/2015 | Gentile | ................... | G09F 13/02 362/611 |
| 2018/0291140 A1* | 10/2018 | Yoshida | ............... | C08G 61/124 |
| 2020/0057176 A1* | 2/2020 | Sugawara | ................ | C08K 3/22 |

FOREIGN PATENT DOCUMENTS

| | | |
|---|---|---|
| JP | 6-312600 A | 11/1994 |
| JP | 2011-221376 A | 11/2011 |
| JP | 2012-9160 A | 1/2012 |
| JP | 2012-64441 A | 3/2012 |
| JP | 2013-145651 A | 7/2013 |
| WO | 2008/120680 A1 | 10/2008 |
| WO | WO-2018151030 A1 * | 8/2018 ............... C08K 3/22 |

\* cited by examiner

*Primary Examiner* — Donald L Raleigh
(74) *Attorney, Agent, or Firm* — Renner, Otto, Boisselle & Sklar, LLP

(57) ABSTRACT

A lighting apparatus includes: a light source module; a light guide that guides light emitted from the light source module; and a light exit structure provided in the light guide, for causing the light to exit the light guide. The light guide includes: a base material that is flexible and light-transmissive; and a visible-light absorber uniformly dispersed in the base material. The visible-light absorber has a maximum absorption wavelength of at least 500 nm and at most 750 nm.

11 Claims, 2 Drawing Sheets

LIGHTING APPARATUS

CROSS REFERENCE TO RELATED APPLICATION

This application claims the benefit of priority of Japanese Patent Application Number 2019-034779, filed on Feb. 27, 2019, the entire content of which is hereby incorporated by reference.

TECHNICAL FIELD

The present disclosure relates to a lighting apparatus.

BACKGROUND ART

In recent years, edge light type lighting apparatuses in which light enters through an edge surface of a light guide plate and light exits from a desired portion of the light guide plate have been known (for example, see Japanese Unexamined Patent Application Publication No. HEI6-312600, and Japanese Unexamined Patent Application Publication No. 2012-64441).

SUMMARY

However, in the above conventional lighting apparatuses, there is a problem of change in color tone caused by absorption of light having a specific wavelength component into the light guide plate while light is guided through the light guide plate. For example, when white light is guided through the light guide plate, the light changes into yellow-tinged light and desired optical characteristics are not achieved. Furthermore, in recent years, lighting apparatuses are requested to be used for various applications without limitations such as the installation location and the shape of a light-emitting surface.

In view of the above, an object of one aspect of the present invention is to provide a lighting apparatus that achieves desired optical characteristics and is broadly applied.

In order to achieve the above object, a lighting apparatus according to one aspect of the present invention includes: a light source; a light guide that guides light emitted from the light source; and a light exit structure provided in the light guide, for causing the light to exit the light guide, in which the light guide includes: a resin base material that is flexible and light-transmissive; and a visible-light absorber uniformly dispersed in the resin base material, and the visible-light absorber has a maximum absorption wavelength of at least 500 nm and at most 750 nm.

According to one aspect of the present invention, it is possible to provide a lighting apparatus that achieves desired optical characteristics and is broadly applied.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, a lighting apparatus according to an embodiment of the present invention will be described in detail with reference to the drawings. It should be noted that the embodiment described below is merely one specific example of one aspect of the present invention. Thus, values, shapes, materials, components, and arrangement and connection between the components, and steps and order of the steps shown in the following embodiment are merely by way of illustration and not intended to limit one aspect of the present invention. Therefore, among the components in the embodiment below, components not recited in any one of the independent claims are described as optional components.

The figures are schematic illustrations and not necessarily precise illustrations. Accordingly, for example, the scale of each figure may be different. In the figures, substantially identical components are assigned the same reference signs, and overlapping descriptions thereof may be omitted or simplified.

In the present specification, a term representing the relationship between components, such as uniformly, a term representing the shape of a component, such as a cylinder or a rectangular cylinder, and a numerical range refer to not only precise meanings but also substantially the same meanings, e.g., there may be a difference of a few percent.

Embodiment

[Configuration]

Firstly, a lighting apparatus according to an embodiment will be described with reference to FIGS. 1 and 2.

Figure 1:
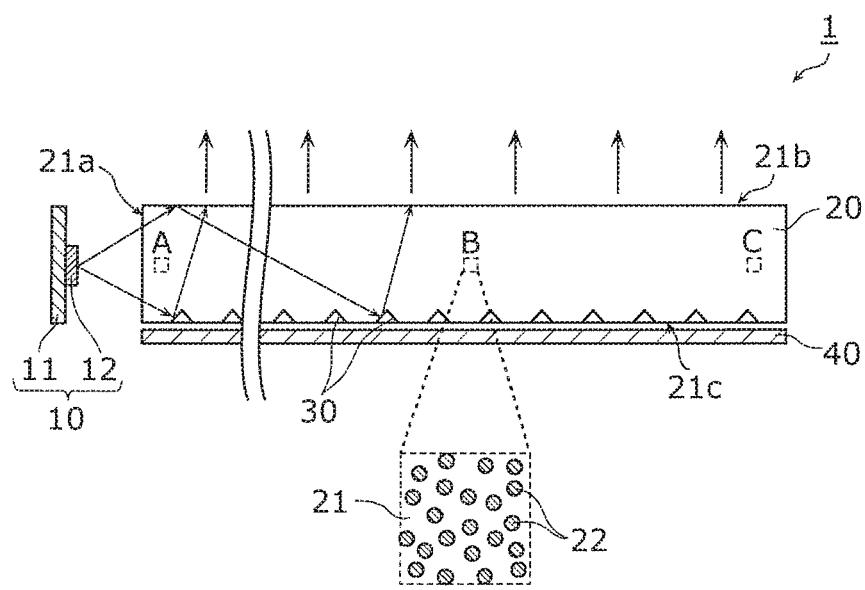
FIG. 1 is a sectional view illustrating the schematic configuration of a lighting apparatus according to an embodiment.

FIG. 1 is a sectional view illustrating the schematic configuration of lighting apparatus 1 according to the present embodiment. As shown in FIG. 1, lighting apparatus 1 includes light source module 10, light guide 20, light exit structure 30, and light reflector 40. It should be noted that lighting apparatus 1 may include a support that supports light source module 10 and light guide 20 in a predetermined positional relationship.

In FIG. 1, the path of light emitted by light emitting element 12 in light source module 10 is schematically denoted by arrows. More specifically, the path of light is schematically denoted by the arrows extending from light emitting element 12, the arrows drawn in light guide 20, and the arrows extending from first main surface 21b of light guide 20 toward outside of light guide 20. It should be noted that for the sake of clarity of the path of light, hatching for a sectional view is not added to base material 21 of light guide 20. The same is true in FIG. 4 described below.

Figure 2:
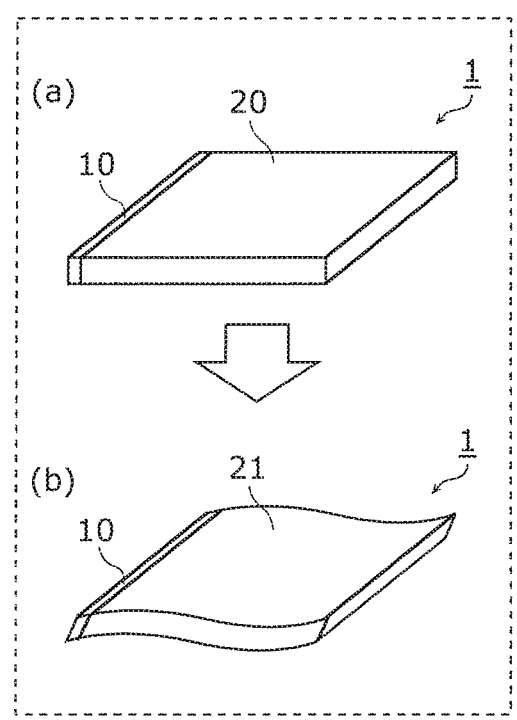
FIG. 2 is a perspective view schematically illustrating the flexibility of the lighting apparatus according to the embodiment.

FIG. 2 is a perspective view schematically illustrating the flexibility of lighting apparatus 1 according to the present embodiment. As shown in FIG. 2, base material 21 of light guide 20 is flexible, and thereby it is possible to easily bend lighting apparatus 1. For example, (a) in FIG. 2 shows a state of base material 21 before bending, and (b) in FIG. 2 shows a state of base material 21 after bending. It should be noted that in FIG. 2, light exit structure 30 and light reflector 40 are omitted.

Light source module 10 is one example of the light source, and includes board 11 and light emitting element 12 as shown in FIG. 1. Light source module 10 emits light toward edge surface 21a of base material 21 in light guide 20.

Board 11 is a mounting board on which light emitting element 12 is mounted. Board 11 is, for example, a glass epoxy board, but not limited to this. Board 11 may be a ceramic board, a resin board, or, a metal-based board. Board 11 may be a rigid board or a flexible board.

Board 11 is disposed facing edge surface 21a of base material 21, and in an orientation parallel to edge surface 21a of base material 21. Board 11 has the shape corresponding to the shape of edge surface 21a. As an example, when edge surface 21a has an elongated shape extending in a predetermined direction, board 11 has an elongated shape extending along edge surface 21a. Light emitting elements 12 are arranged in a line or lines along board 11.

Each of light emitting elements 12 is a surface mount device (SMD)-type light emitting diode (LED) element which emits white light. The SMD-type LED element is a package-type LED element in which a LED chip is mounted in a resin-molded cavity and the cavity is filled with a phosphor-containing resin. The LED chip is, for example, a blue LED chip which emits blue light. The phosphor-containing resin includes phosphors which emit yellow light by receiving blue light. The blue light emitted by the LED chip and the yellow light emitted by the phosphors are mixed, and thus each light emitting element 12 emits white light.

It should be noted that light source module 10 may be a chip on board (COB)-type LED module in which a LED chip is directly mounted on board 11. In this case, the LED chip is one example of light emitting element 12, and the phosphor-containing resin is provided on board 11 to cover the LED chip.

Furthermore, instead of the LED element, light source module 10 may include an organic electroluminescence (EL) element, a semiconductor laser element, or the like, as light emitting element 12. The number of light emitting elements 12 included in light source module 10 may be only one. For example, when edge surface 21a of base material 21 is square or circle, the shape of board 11 may be square or circle. In this case, light source module 10 may include only one light emitting element 12 mounted on the center of board 11. Alternatively, light source module 10 need not include board 11 and light emitting element 12, and may be a discharge lamp such as a fluorescent light.

Light guide 20 guides light emitted from light source module 10. As shown in FIG. 1, light guide 20 includes base material 21 and visible-light absorbers 22 uniformly dispersed in base material 21.

Base material 21 is one example of a resin base material that is flexible and light-transmissive. In other words, base material 21 is made from a flexible and light-transmissive resin material. More specifically, the Young's modulus of base material 21 is at most 1 GPa, but not limited to this. For example, the Young's modulus of base material 21 may be at most 0.8 GPa or at most 0.5 GPa.

As shown in (a) of FIG. 2, base material 21 is a sheet-shaped component having a uniform thickness. As shown in FIG. 1, base material 21 has edge surface 21a, first main surface 21b, and second main surface 21c. Edge surface 21a faces light source module 10, and is a light incident surface through which light emitted from light source module 10 enters. First main surface 21b is a light exit surface through which light guided through base material 21 exits, i.e., a light emitting surface. Second main surface 21c is an opposite surface to first main surface 21b. Light exit structure 30 is provided on second main surface 21c.

It should be noted that the shape of base material 21 is not particularly limited. Base material 21 may be curved plate. Alternatively, base material 21 may be a cylinder-shaped or rectangular-cylinder-shaped bar (rod) component extending in a predetermined direction. In this case, edge surface 21a of base material 21 is, for example, the bottom surface of the cylinder or rectangular cylinder. The thickness or diameter of base material 21 is, for example, at least 1 mm and at most 50 mm, but is not limited to this. For example, the upper limit of the thickness or diameter of base material 21 may be 30 mm or 20 mm. For example, the lower limit of the thickness or diameter of base material 21 may be 5 mm or 10 mm.

Base material 21 is formed by, for example, extrusion molding using a resin material. The resin material and visible-light absorbers 22 are mixed to be uniformly dispersed, and thereby base material 21 including uniformly dispersed visible-light absorbers 22 is formed.

FIG. 1 schematically illustrates, in the inside of base material 21, region A close to edge surface 21a that is the light incident surface, region C close to the opposite edge surface to edge surface 21a, and region B located between region A and region C, each of which is surrounded by a dotted line. FIG. 1 also schematically illustrates the enlarged region B in which visible-light absorbers 22 are uniformly dispersed in base material 21.

Although not shown in FIG. 1, visible-light absorbers 22 are also dispersed in region A and region C. When region A, region B, and region C are the same in size, each region contains substantially the same amount of visible-light absorbers 22. In other words, "uniformly dispersed" means that any region in base material 21 contains substantially the same amount of visible-light absorbers 22. For example, a difference in amount of visible-light absorbers 22 between any two regions is within ±10%.

Visible-light absorber 22 has an absorption end in the visible-light band. More specifically, visible-light absorber 22 selectively absorbs a predetermined wavelength component in the visible-light band. Visible-light absorber 22 does not absorb light other than the target wavelength component.

Figure 3:
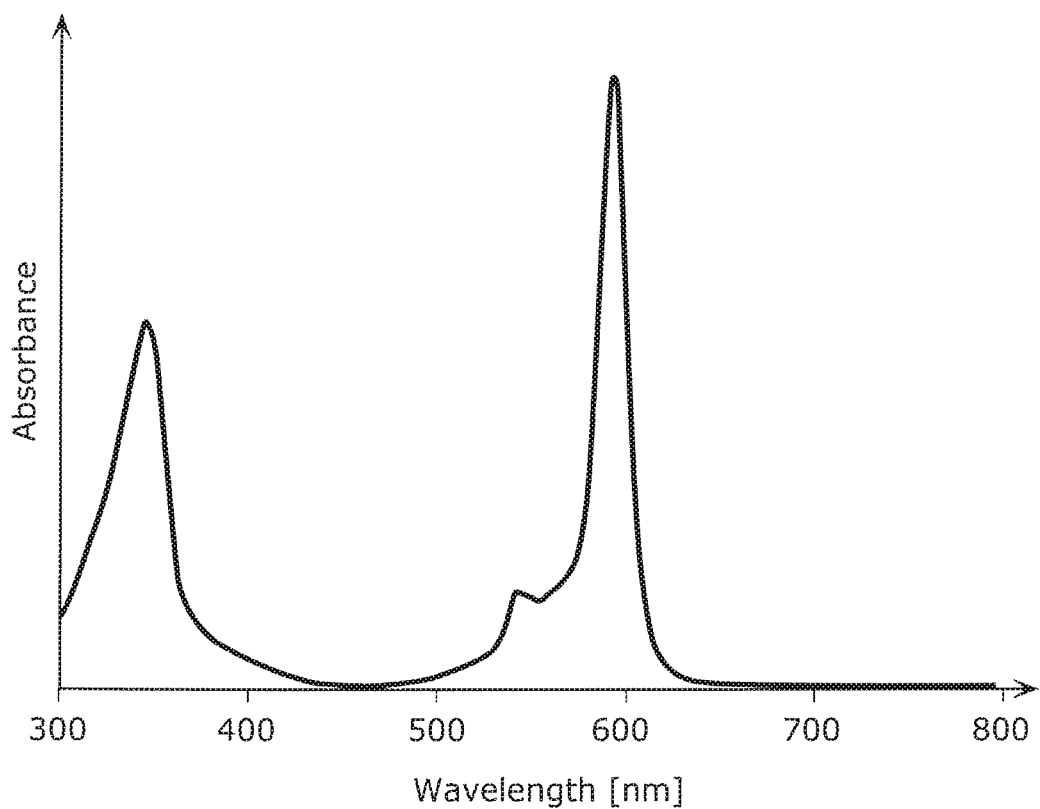
FIG. 3 is a graph illustrating the absorption spectrum of visible-light absorbers dispersed in a base material of a light guide in the lighting apparatus according to the embodiment.

FIG. 3 is a graph illustrating one example of the absorption spectrum of visible-light absorbers 22 dispersed in light guide 20 of lighting apparatus 1 according to the present embodiment. In FIG. 3, the horizontal axis represents a wavelength of light (unit: nm), and the vertical axis represents absorbance. The absorption of the corresponding wavelength component increases with an increase in absorbance.

As shown in FIG. 3, the maximum absorption wavelength of visible-light absorber 22 is at least 500 nm and at most 750 nm. The maximum absorption wavelength of visible-light absorber 22 may be at least 550 nm and at most 650 nm. The maximum absorption wavelength of visible-light absorber 22 may be at least 580 nm and at most 620 nm. As one example, the maximum absorption wavelength of visible-light absorber 22 is 594 nm. More specifically, a tetraazaporphyrin copper complex can be used as visible-light absorber 22.

In the present embodiment, visible-light absorber 22 also has an absorption peak in the ultraviolet band up to and including 370 nm. With this, the ultraviolet rays entering base material 21 can be absorbed, and thus it is possible to prevent the deterioration of the resin material included in base material 21. Accordingly, lighting apparatus 1 can be also used in an outdoor environment exposed to light of the sun.

Light exit structure 30 is a structure for causing light guided through light guide 20 to exit light guide 20. Light exit structure 30 is provided in light guide 20. More specifically, light exit structure 30 comprises prisms provided on second main surface 21c of base material 21. As shown in FIG. 1, the prisms are each a recess which is recessed from second main surface 21c toward first main surface 21b.

The prisms are formed by, for example, lasering. More specifically, after base material 21 is molded, the recessed prisms are formed by irradiating second main surface 21c with lasers to melt parts of second main surface 21c. Alternatively, the prisms and base material 21 may be integrally formed using a metal mold having protrusions corresponding to the prisms.

The prisms may be protrusions which protrude from second main surface 21c away from first main surface 21b. For example, the prisms may be formed by coating. More specifically, after base material 21 is molded, the prisms may be formed by applying a resin material in dotted form using ink-jet technique.

Furthermore, the prisms are separately and uniformly disposed on entire second main surface 21c. For example, the prisms may be regularly disposed in a matrix in second main surface 21c. Alternatively, the prisms may be randomly disposed in second main surface 21c. The prisms may be provided only in the vicinity of a part of light guide 20 from which light is caused to exit.

Furthermore, the prisms may be more closely disposed as the distance from edge surface 21a that is the light incident surface increases, i.e., as the light guide distance increases. In other words, the number of prisms per area may be smaller in a region closer to edge surface 21a, and may be greater in a region farther away from edge surface 21a. The amount of light guided through base material 21 decreases with an increase in the light guide distance. It is possible to cause the light to uniformly exit through entire first main surface 21b by increasing the number of prisms in accordance with the rate of decrease in amount of light.

Light reflector 40 is a reflective component provided along second main surface 21c. Light reflector 40 is, for example, a white resin cover, or a metal cover. The leakage of light from second main surface 21c can be prevented by providing light reflector 40. With this, the amount of light exiting through first main surface 21b can be increased, and thus it is possible to enhance the light exit efficiency of lighting apparatus 1. It should be noted that lighting apparatus 1 need not include light reflector 40.

[Optical Characteristics of Light Guide]

Next, the optical characteristics of light guide 20 will be described.

As shown in FIG. 1, the light entering base material 21 through edge surface 21a is guided through base material 21 while repeating total reflection at first main surface 21b and second main surface 21c. When the light guided through base material 21 is incident on one of the prisms included in light exit structure 30, the light is reflected by the prism to exit through first main surface 21b.

In doing so, base material 21 is made from a resin material, and thus a short wavelength component of the light guided through base material 21 is easy to be absorbed or scattered. The amount of absorbed or scattered light increases with an increase in distance that the light has been guided through base material 21, and thus the change in color tone of light exiting through first main surface 21b increases with an increase in distance from edge surface 21a. More specifically, the wavelength components ranging from 400 nm to 500 nm decrease, and thus the light exiting through first main surface 21b loses a blue component and changes into yellow-tinged light as the distance from edge surface 21a increases.

In the present embodiment, visible-light absorbers 22 having the maximum absorption wavelength of at least 500 nm and at most 750 nm are uniformly dispersed in base material 21. With this, the long wavelength component of the light guided through base material 21 can be absorbed in accordance with a decrease in short wavelength component caused by base material 21. Accordingly, it is possible to prevent the change in color tone of the light exiting through first main surface 21b.

Furthermore, as described above, base material 21 is made from a flexible and light-transmissive resin material. As the flexible and light-transmissive resin material, a silicon resin is known. However, the silicon resin has a high absorptance for the short wavelength component. Thus, when base material 21 is made from a silicon resin, the rate of decrease in short wavelength component to the light guide distance is increased. Accordingly, when the long wavelength component is absorbed by visible-light absorber 22, the amount of exiting light is decreased. For this reason, the silicon resin is not appropriate as a resin material included in base material 21 having a long light guide distance.

In view of above, in the present embodiment, as a resin material included in base material 21, a resin composition of a hydrogenated block copolymer having an alkoxysilyl group and a hydrocarbon polymer having the number average molecular weight of 300 to 5000 can be used. The resin composition contains 1 to 50 pts. wt. of the hydrocarbon polymer having the number average molecular weight of 300 to 5000 per 100 pts. wt. of the hydrogenated block copolymer having the alkoxysilyl group.

The hydrogenated block copolymer having the alkoxysilyl group is formed by adding the alkoxysilyl group to the hydrogenated block copolymer obtained by hydrogenating at least 90% of all the unsaturated bonds of a block copolymer. The block copolymer includes two or more polymer blocks [A] each of which is mainly composed of repeating units originated from an aromatic vinyl compound, and one or more polymer blocks [B] each of which is mainly composed of repeating units originated from a chain conjugated diene compound. When the weight ratio of all the polymer blocks [A] to the entire block copolymer is represented as wA and the weight ratio of all the polymer blocks [B] to the entire block copolymer is represented as wB, the ratio between wA and wB (wA:wB) ranges from 30:70 to 65:35.

Furthermore, as a component in the polymer block [A] other than the repeating unit originated from an aromatic vinyl compound, a repeating unit originated from a chain conjugated diene compound and/or another repeating unit originated from an ethylenically unsaturated compound may be included. These amounts are each at most 10 wt. % of the entire polymer block [A], but may be at most 5 wt. % or 1 wt. %.

Furthermore, as a component in the polymer block [B] other than the repeating unit originated from a chain conjugated diene compound, a repeating unit originated from an aromatic vinyl compound and/or a repeating unit originated from another ethylenically unsaturated compound may be included. These amounts are each at most 10 wt. % of the entire polymer block [B], but may be at most 5 wt. % or 1 wt. %.

As the aromatic vinyl compound for the block copolymer, styrene or styrenes having an alkyl group, a halogen atom, or an alkoxy group as a substituent can be used. As the styrenes having the alkyl group as the substituent, α-methyl styrene, 3-methyl styrene, 4-methyl styrene, 2,4-diisopropyl styrene, 2,4-dimethyl styrene, 4-t-butyl styrene, 5-t-butyl-2-methyl styrene, etc., can be used. As the styrenes having the halogen atom as the substituent, 4-chloro styrene, 2-fluoro styrene, 2,4-dichloro styrene, etc., can be used. As the styrenes having the alkoxy group as the substituent, 3-methoxy styrene, 4-methoxy styrene, 3,5-dimethoxy styrene, 4-t-buthoxy styrene, etc., can be used.

As the chain conjugated diene compound for the block copolymer, a compound having no polar group, such as 1,3-butadiene, isoprene, 2,3-dimethyl-1,3-butadiene, 1,3-pentadiene, can be used.

As another ethylenically unsaturated compound, a chain ethylenically unsaturated compound or a cyclic ethylenically unsaturated compound can be used. This ethylenically unsaturated compound may have a nitrile group, an alkoxycarbonyl group, a carboxyl group, an acid anhydride group, or a halogen group as the substituent. For example, the ethylenically unsaturated compound is chain olefin or cyclic olefin. As the chain olefin, ethylene, propylene, 1-butene, 1-pentene, 1-hexene, 1-heptene, 1-octene, 1-nonen, 1-decene, 1-dodecene, 1-eicosen, 4-methyl-1-pentene, 4,6-dimethyl-1-heptene, etc., can be used. As the cyclic olefin, for example, vinylcyclohexene obtained by hydrogenating at least 90% of the unsaturated moiety can be used.

As the method for adding an alkoxysilyl group to a block copolymer, for example, a method can be used in which the above hydrogenated block copolymer is reacted with an ethylenically unsaturated silane compound in the presence of peroxide. The added amount of the alkoxysilyl group is 0.1 to 10 pts. wt. per 100 pts. wt. of the hydrogenated block copolymer, but may be 0.2 to 5 pts. wt. or 0.3 to 3 pts. wt. The added amount of the alkoxysilyl group can be calculated from $^1$H-NMR measurement data of the obtained hydrogenated block copolymer.

As the ethylenically unsaturated silane compound, a compound graft-polymerized with the above hydrogenated block copolymer to add an alkoxysilyl group to the hydrogenated block copolymer can be used. More specifically, as the ethylenically unsaturated silane compound, vinyl trialkoxysilane, allyl trialkoxysilane, dialkoxyalkylvinylsilane, p-styryl trialkoxysilane, (meta)acryloxyalkyl trialkoxysilane, etc., can be used.

As the vinyl trialkoxysilane, for example, vinyl trimethoxysilane, vinyl triethoxysilane, etc., can be used. As the allyl trialkoxysilane, for example, allyl trimethoxysilane, allyl triethoxysilane, etc., can be used. As the dialkoxyalkylvinylsilane, for example, dimethoxymethylvinylsilane, diethoxymethylvinylsilane, etc., can be used. As the p-styryl trialkoxysilane, for example, p-styryl trimethoxysilane, p-styryl triethoxysilane, etc., can be used. As the (meta)acryloxyalkyl trialkoxysilane, for example, 3-methacryloxypropyl methyldimethoxysilane, 3-metacryloxypropyl trimethoxysilane, 3-acryloxypropyl trimethoxysilane, etc., can be used.

These ethylenically unsaturated silane compounds may be used independently, or in combination of two or more of them. The used amount of the ethylenically unsaturated silane compound is 0.1 to 10 pts. wt. per 100 pts. wt. of the hydrogenated block copolymer, but may be 0.2 to 5 pts. wt. or 0.3 to 3 pts. wt.

As the peroxide, peroxide the half of which is decomposed in 1 minute at 170 to 190 degrees C. can be used. For example, as the peroxide, t-butylcumyl peroxide, dicumyl peroxide, di-t-hexyl peroxide, 2,5-dimethyl-2,5-di(t-butylperoxy) hexane, di-t-butyl peroxide, etc., can be used. These peroxides may be used independently, or in combination of two or more of them. The used amount of the peroxide is 0.05 to 2 pts. wt. per 100 pts. wt. of the hydrogenated block copolymer, but may be 0.1 to 1 pts. wt. or 0.2 to 0.5 pts. wt.

As the hydrocarbon polymer, for example, at least one selected from a group consisting of polyisobutylene, polybutene, poly-4-methylpentene, poly-1-octene, ethylene-alpha-olefin copolymer and hydride thereof, aliphatic hydrocarbon resin and hydride thereof, alicyclic hydrocarbon resin and hydride thereof, and polyisoprene and hydride thereof can be used. Furthermore, the hydrocarbon polymer may include a polar group such as an alkoxysilyl group, an ester group, a hydroxyl group, an amide group, an amino group, or an acid anhydride group. The transparency of base material 21 can be improved by using polyisobutylene, polybutene, hydrogenated polyisobutylene, hydrogenated polyisoprene, etc., as the hydrocarbon polymer.

In the present embodiment, the above resin composition is used as the resin material included in base material 21, and thereby visible-light absorbers 22 can be uniformly dispersed while maintaining the flexibility and light transmissivity of base material 21. Furthermore, the absorption and scattering of the short wavelength component caused by base material 21 can be reduced, and thus the amount of light exiting through first main surface 21b is ensured to be above a certain level. In other words, it is possible to sufficiently fulfill the lighting functionality of lighting apparatus 1.

[Effects]

As described above, lighting apparatus 1 according to the present embodiment includes: light source module 10; light guide 20 that guides light emitted from light source module 10; and light exit structure 30 provided in light guide 20, for causing the light to exit light guide 20. Light guide 20 includes: base material 21 that is flexible and light-transmissive; and visible-light absorber 22 uniformly dispersed in base material 21. Visible-light absorber 22 has a maximum absorption wavelength of at least 500 nm and at most 750 nm.

With this, visible-light absorbers 22 are dispersed in light guide 20, and thus the light guided through light guide 20 decreases since the short wavelength component is absorbed or scattered by base material 21 of light guide 20 and the long wavelength component is absorbed by visible-light absorbers 22. In other words, both of the short wavelength component and the long wavelength component decrease, and thus change in color tone of light guided through light guide 20 is prevented.

Furthermore, visible-light absorbers 22 are uniformly dispersed, and thus regardless of the light guide distance, the decrease in the short wavelength component caused by base material 21 and the decrease in the long wavelength component caused by visible-light absorbers 22 are balanced. Accordingly, regardless of the light exit position of light guide 20, it is possible to cause the light to exit almost without change in color tone.

Furthermore, light guide 20 is flexible, and thus it is possible to easily bend light guide 20. Accordingly, lighting apparatus 1 can be not only installed on a flat surface but also easily installed along a curved surface. For example, lighting apparatus 1 can be placed on a curved portion of a stair railing, a corner of a room, etc., by bending light guide 20.

It should be noted that even when base material 21 is rigid, base material 21 is bendable by decreasing the thickness or diameter. In this case, however, edge surface 21a which is the light incident surface becomes smaller, and thus light guide 20 cannot guide a sufficient amount of light. Accordingly, the amount of light exiting through first main surface 21b is decreased. In contrast, in lighting apparatus 1 according to the present embodiment, base material 21 is flexible, and thus the thickness or diameter of base material 21 can be increased. Accordingly, a sufficient amount of light can exit through first main surface 21b.

As described above, according to the present embodiment, it is possible to achieve lighting apparatus 1 that achieves desired optical characteristics and is broadly applied.

Furthermore, for example, light exit structure 30 comprises prisms provided on a surface of base material 21.

With this, light can be caused to exit light guide 20 in a desired direction. The prisms can be easily formed in a further uniform shape by lasering or coating. Accordingly, the adjustment of the light exit amount and light exit direction is simplified, and thus it is possible to achieve the desired optical characteristics.

(Variations)

Hereinafter, a variation of the embodiment will be described with reference to FIG. 4.

Figure 4:
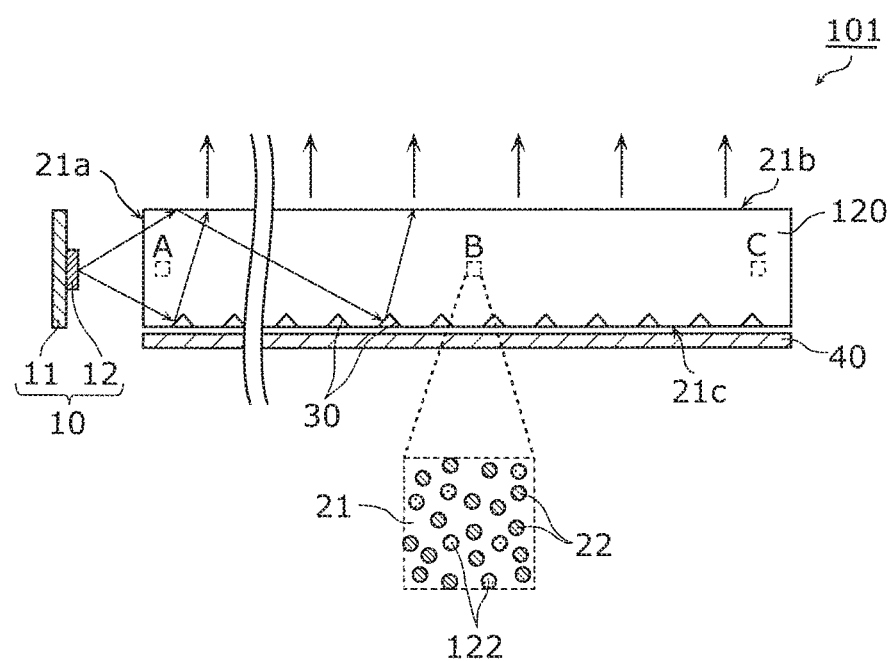
FIG. 4 is a sectional view illustrating the schematic configuration of a lighting apparatus according to a variation of the embodiment.

FIG. 4 is a sectional view illustrating the schematic configuration of lighting apparatus 101 according to a variation of the embodiment. As shown in FIG. 4, lighting apparatus 101 differs from lighting apparatus 1 according to the embodiment in that light guide 120 is included instead of light guide 20. The following mainly focuses on differences between the variation and the embodiment, and the common explanation is omitted or simplified.

Light guide 120 according to the variation includes base material 21 in which ultraviolet-light absorbers 122 as well as visible-light absorbers 22 are uniformly dispersed. Ultraviolet-light absorber 122 has an absorption end in the ultraviolet-light band. More specifically, ultraviolet-light absorber 122 selectively absorbs a predetermined wavelength component in the ultraviolet-light band. Ultraviolet-light absorber 122 does not absorb light other than the target wavelength component. For example, the maximum absorption wavelength of ultraviolet-light absorber 122 is at least 260 nm and at most 380 nm. As ultraviolet-light absorber 122, at least one of a benzophenone ultraviolet-light absorber, a salicylic acid ultraviolet-light absorber, and a benzotriazole ultraviolet-light absorber can be used.

As the benzophenone ultraviolet-light absorber, for example, 2,4-dihydroxybenzophenone, 2-hydroxy-4-methoxybenzophenone, 2-hydroxy-4-methoxybenzophenone-5-sulfonic acid trihydrate, 2-hydroxy-4-octyloxybenzophenone, 4-dodecaroxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, etc., can be used.

As the salicylic acid ultraviolet-light absorber, for example, phenyl salicylate, 4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, etc., may be used.

As the benzotriazole ultraviolet-light absorber, for example, 2-(2-hydroxy-5-methylphenyl)-2H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole, 2-(3,5-di-t-butyl-2-hydroxyphenyl)-2H-benzotriazole, 2-(2-hydroxy-5-t-octylphenyl)-2H-benzotriazole, 2-(2-hydroxy-4-octylphenyl)-2H-benzotriazole, 2-(2H-benzotriazole-2-yl)-4-methyl-6-(3,4,5,6-tetrahydrophthalimidylmethyl)phenol, 2,2'-methylenebis[4-(1,1,3,3-tetramethylbutyl)-6-[(2H-benzotriazole-2-yl)phenol]], etc., can be used.

The amount of ultraviolet-light absorber 122 is 0.01 to 2 pts. wt. per 100 pts. wt. of the hydrogenated block copolymer having the alkoxysilyl group, but may be 0.02 to 1.5 pts. wt. or 0.04 to 1.0 pts. wt. For example, the amount of ultraviolet-light absorber 122 per unit volume contained in base material 21 is less than the amount of visible-light absorber 22 per unit volume. Alternatively, the amount of ultraviolet-light absorber 122 per unit volume contained in base material 21 is more than or equal to the amount of visible-light absorber 22 per unit volume.

As described above, in lighting apparatus 101 according to the variation, base material 21 includes ultraviolet-light absorbers 122 which are uniformly dispersed.

With this, ultraviolet-light absorber 122 absorbs ultraviolet light entering light guide 120 from outside, and thus it is possible to prevent the deterioration of the resin material included in base material 21 of light guide 120, caused by the ultraviolet light. Accordingly, lighting apparatus 101 can be also used in an outdoor environment exposed to light of the sun, and can be more broadly applied.

Furthermore, for example, the maximum absorption wavelength of ultraviolet-light absorber 122 is at least 260 nm and at most 380 nm.

With this, ultraviolet-light absorber 122 can efficiently absorb the wavelength component that affects the deterioration of the resin.

(Others)

As described above, the lighting apparatus according to one aspect of the present invention has been described in accordance with the above embodiment and its variation, but one aspect of the present invention is not limited to this.

For example, light guide 20 or 120 may uniformly include a light stabilizer or an antioxidant. With this, the light resistance or heat resistance of light guide 20 or 120 can be improved.

As the light stabilizer, for example, a hindered amine light stabilizer can be used. In particular, as the light stabilizer, a compound having 3,5-di-t-butyl-4-hydroxyphenyl group, 2,2,6,6-tetramethylpiperidyl group, 1,2,2,6,6-pentamethyl-4-piperidyl group, or the like, can be used.

More specifically, as the light stabilizer, N,N'-bis(2,2,6,6-tetramethyl-4-N-methylpiperidyl)-N,N'-diformyl-alkylenediamines, N,N'-bis(2,2,6,6-tetramethyl-4-piperidyl)-N,N'-diformylalkylenediamines, N,N'-bis(2,2,6,6-tetramethyl-4-piperidyl)-N,N'-bisalkylene fatty acid amides, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], etc., are used. Alternatively, as the light stabilizer, N,N'-bis(2,2,6,6-tetramethyl-4-piperidyl)-N,N'-diformylalkylenediamines, a reaction product of (i) a polymer of N,N'-bis(2,2,6,6-tetramethyl-4-piperidinyl)-1,6-hexanediamine and 2,4,6-trichloro-1,3,5-triazine, (ii) N-butyl-1-butanamine, and (iii) N-butyl-2,2,6,6-tetramethyl-4-piperidinamine, or the like may be used.

The amount of such a hindered amine light stabilizer is 0.001 to 2 pts. wt. per 100 pts. wt. of the hydrogenated block copolymer having the alkoxysilyl group, but may be 0.002 to 1 pts. wt. or 0.005 to 0.5 pts. wt.

As the antioxidant, for example, a phosphorus-containing antioxidant, a phenolic antioxidant, and a sulfur-containing antioxidant can be used.

As the phosphorus-containing antioxidant, for example, a monophosphite compound, a diphosphite compound, etc., can be used. As the monophosphite compound, for example, triphenyl phosphite, diphenylisodecyl phosphite, phenyldiisodecyl phosphite, tris(nonylphenyl) phosphite, tris(dinonylphenyl) phosphite, tris(2,4-di-t-butylphenyl) phosphite, 10-(3,5-di-t-butyl-4-hydroxybenzyl)-9,10-dihydro-9-oxa-10-phosphaphenanthrene-10-oxide, etc., can be used. As the diphosphite compound, for example, 4,4'-butylidene-bis(3-methyl-6-t-butylphenyl-di-tridecylphosphite), 4,4'-isopropyliden-bis(phenyl-di-alkyl(C12 to C15)phosphite), etc., can be used. As the phosphorus-containing antioxidant, a compound such as 6-[3-(3-t-butyl-4-hydroxy-5-methylphenyl)propoxy]-2,4,8,10-tetrakis-t-butyldibenzo[d,f][1.3.2]dioxaphosphepin, or 6-[3-(3,5-di-t-butyl-4-hydroxyphenyl)propoxy]-2,4,8,10-tetrakis-t-butyldibenzo[d,f][1.3.2] dioxaphosphepin can be used.

As the phenolic antioxidant, for example, a compound such as pentaerythrityl-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, 3,9-bis{2-[3-(3-t-butyl-4-hydroxy-t-methylphenyl)propionyloxy]-1,1-dimethylethyl}-2,4,8,10-tetraoxaspiro[5,5]undecane, or 1,3,5-trimethyl-2,4,6-tris(3,5-di-t-butyl-4-hydroxybenzyl) benzene can be used.

As the sulfur-containing antioxidant, for example, a compound such as dilauryl-3,3'-thiodipropionate, dimyristyl 3,3'-thiodipropionate, distearyl-3,3'-thiodipropionate, laurylstearyl-3,3'-thiodipropionate, pentaerythritol-tetrakis-(β-lauryl-thiopropionate), or 3,9-bis(2-dodecylthioethyl)-2,4,8,10-tetraoxaspiro[5,5]undecane can be used.

The amount of such an antioxidant is 0.01 to 2 pts. wt. per 100 pts. wt. of the hydrogenated block copolymer having the alkoxysilyl group, but may be 0.05 to 1.5 pts. wt. or 0.1 to 1 pts. wt.

Furthermore, for example, when a short light guide distance is sufficient for some applications, a silicone resin may be used as base material 21.

Forms obtained by various modifications to the foregoing embodiment that can be conceived by a person of skill in the art as well as forms realized by arbitrarily combining structural components and functions in the embodiment which is within the scope of the essence of the present invention are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting apparatus, comprising:
a light source;
a light guide that guides light emitted from the light source; and
a light exit structure provided in the light guide, for causing the light to exit the light guide, wherein
the light guide includes:
a resin base material that is flexible and light-transmissive; and
a visible-light absorber uniformly dispersed in the resin base material, and
the visible-light absorber has a maximum absorption wavelength of at least 500 nm and at most 750 nm, and further has an absorption peak in an ultraviolet band up to and including 370 nm.

2. The lighting apparatus according to claim 1, wherein the resin base material further includes an ultraviolet-light absorber in addition to the visible-light absorber, wherein the ultraviolet-light absorber is uniformly dispersed in the resin base material.

3. The lighting apparatus according to claim 2, wherein the ultraviolet-light absorber has a maximum absorption wavelength of at least 260 nm and at most 380 nm.

4. The lighting apparatus according to claim 1, wherein the light exit structure comprises a plurality of prisms provided on a surface of the resin base material.

5. The lighting apparatus according to claim 4, further comprising:
a light reflector provided along the surface of the resin base material.

6. The lighting apparatus according to claim 4, wherein the plurality of prisms are separately and uniformly disposed on the surface.

7. The lighting apparatus according to claim 1, wherein the resin base material has a Young's modulus of at most 1 GPa.

8. The lighting apparatus according to claim 1, wherein the resin base material includes a resin composition of a hydrogenated block copolymer having an alkoxysilyl group and a hydrocarbon polymer having a number average molecular weight of 300 to 5000, and
the resin composition contains 1 to 50 parts by weight (pts.wt.) of the hydrocarbon polymer having the number average molecular weight of 300 to 5000 per 100 pts.wt. of the hydrogenated block copolymer having the alkoxysilyl group.

9. The lighting apparatus according to claim 8, wherein the hydrogenated block copolymer having the alkoxysilyl group is formed by adding the alkoxysilyl group to the hydrogenated block copolymer obtained by hydrogenating at least 90% of all unsaturated bonds of a block copolymer,
the block copolymer includes two or more polymer blocks [A] each of which is mainly composed of repeating units originated from an aromatic vinyl compound, and one or more polymer blocks [B] each of which is mainly composed of repeating units originated from a chain conjugated diene compound, and
when a weight ratio of all the polymer blocks [A] to the entire block copolymer is represented as wA and a weight ratio of all the polymer blocks [B] to the entire block copolymer is represented as wB, a ratio between wA and wB (wA:wB) ranges from 30:70 to 65:35.

10. A lighting apparatus, comprising:
a light source;
a light guide that guides light emitted from the light source; and
a light exit structure provided in the light guide, for causing the light to exit the light guide, wherein
the light guide includes:
a resin base material that is flexible and light-transmissive; and
a visible-light absorber uniformly dispersed in the resin base material, and
the visible-light absorber has a maximum absorption wavelength of at least 500 nm and at most 750 nm, wherein the resin base material includes a resin composition of a hydrogenated block copolymer having an alkoxysilyl group and a hydrocarbon polymer having a number average molecular weight of 300 to 5000, and the resin composition contains 1 to 50 parts by weight (pts.wt.) of the hydrocarbon polymer having the number average molecular weight of 300 to 5000 per 100 pts.wt. of the hydrogenated block copolymer having the alkoxysilyl group.

11. The lighting apparatus according to claim 10, wherein the hydrogenated block copolymer having the alkoxysilyl group is formed by adding the alkoxysilyl group to the hydrogenated block copolymer obtained by hydrogenating at least 90% of all unsaturated bonds of a block copolymer, the block copolymer includes two or more polymer blocks [A] each of which is mainly composed of repeating units originated from an aromatic vinyl compound, and one or more polymer blocks [B] each of which is mainly composed of repeating units originated from a chain conjugated diene compound, and when a weight ratio of all the polymer blocks [A] to the entire block copolymer is represented as wA and a weight ratio of all the polymer blocks [B] to the entire block copolymer is represented as wB, a ratio between wA and wB (wA:wB) ranges from 30:70 to 65:35.

* * * * *